United States Patent [19]
Orscheln et al.

[11] Patent Number: 5,974,779
[45] Date of Patent: Nov. 2, 1999

[54] ANCHOR LINK

[75] Inventors: William L. Orscheln, Cairo; Robert L. Heimann, Stoutsville, both of Mo.

[73] Assignee: Elisha Technologies Co. LLC, Moberly, Mo.

[21] Appl. No.: 09/240,159

[22] Filed: Jan. 29, 1999

Related U.S. Application Data

[60] Provisional application No. 60/073,243, Jan. 30, 1998.
[51] Int. Cl.$^6$ .................................................. F16G 15/02
[52] U.S. Cl. ............................................ 59/84; 59/85
[58] Field of Search .............................. 59/35.1, 78, 84, 59/85, 86, 93

[56] References Cited

U.S. PATENT DOCUMENTS

| | | | |
|---|---|---|---|
| 4,179,878 | 12/1979 | Albertini | 59/85 |
| 4,418,526 | 12/1983 | Clement | 59/85 |
| 4,590,758 | 5/1986 | Hannig et al. | 59/85 |
| 4,870,739 | 10/1989 | Richards | 29/252 |
| 5,345,754 | 9/1994 | Daramaux et al. | 59/30 |
| 5,714,093 | 2/1998 | Heimann et al. | 252/389.62 |

*Primary Examiner*—David Jones
*Attorney, Agent, or Firm*—Michael K. Boyer

[57] ABSTRACT

An coupling link or anchor link is disclosed. The link includes a pin for a coupling link that increases the ease with which links are disassembled and maintained. The pin structure provides a means for dispensing or delivering grease into the interior of the link. A lubricant is also disclosed for improving the corrosion resistance of conventional links as well as the disclosed links.

7 Claims, 4 Drawing Sheets

ANCHOR LINK

The subject matter herein claims benefit under 35 U.S.C. 111(a), 35 U.S.C. 119(e) and 35 U.S.C. 120 of U.S. Provisional Patent Application Serial No. 60/073,243, filed on Jan. 30, 1998; and entitled "Improved Coupling Link". The disclosure of the aforementioned Provisional Patent Application is hereby incorporated by reference.

FIELD OF THE INVENTION

The instant invention relates to an improved coupling link that has improved corrosion resistance and ease of maintenance as well as a method for performing the maintenance for maintaining corrosion resistance.

BACKGROUND OF THE INVENTION

Coupling or connecting links are employed in a wide range of end-uses such as mooring buoys, drilling rigs, anchor chains, joining sections of wire rope or strand. The links are normally employed near salt or brackish water that enhances the corrosion rate of the links and reduces the useful life of the links.

Anchorage hardware and moorings used in marine applications are periodically inspected and subjected to routine maintenance. Due to corrosion, however, the inspection and maintenance process often requires additional time and cost. Detachable anchor links allow disassembly of anchor chain and are a key component of anchorage hardware. A detachable link comprise a C-link, two coupling plates, and a tapered pin. Some designs utilize a hairpin to lock in the tapered pin. Disassembly for routine maintenance becomes difficult when corrosion develops at the joint interfaces between the C-link and the coupling plates or in the joint interfaces between the coupling plates and the tapered pin. Typically, links are maintained by manually removing the lead sealant, disassembling the link, sand blasting the components of the link, applying a corrosion resistant material such as animal tallow containing powdered lead, reassembling the link and inserting the pin. Under normal use, the pin corrodes thereby inhibiting, if not preventing, removal of the pin and disassembly of the coupling links. In such cases, the link body must be cut, e.g., an acetylene torch, thereby destroying the link and delaying maintenance and usage of the entire article.

Detachable anchor links have previously been protected from corrosion by painting the exterior with an epoxy polyamide primer and a silicone alkyd enamel topcoat. Color coded striping paint is often applied as an outermost coating layer. The internal cavities of the detachable link are conventionally filled with a white lead filled beef tallow grease or more recently, greases that are not filled with elemental heavy metals. The toxic exposure to personnel and the undesirable environmental and regulatory aspects of utilizing the white lead have been mitigated by utilizing greases that do not contain the heavy elemental metals. However, many of the greases also contain base oils, inhibitors, or other additives that have significant aquatic toxicity. In addition, many greases do not offer sufficient water washout resistance for extended marine use. These issues have prompted the search for environmentally preferred lubricants and gels capable of withstanding the rigorous exposure of the marine environment.

Several coupling links and methods for maintaining chain are described in U.S. Pat. Nos. 4,179,878; 4,870,739; 5,351,359; and Design U.S. Pat. No. DES 287,102. The disclosure of these patents is hereby incorporated by reference.

SUMMARY OF THE INVENTION

The instant invention is an improvement over conventional practices by providing an improved pin for a coupling link that increases the ease with which links are disassembled and maintained. The improved pin structure provides a means for dispensing or delivering a corrosion resistant grease into the interior of the link. The improved pin can also be employed with novel grease formulations that further lengthen the useful life of the link as described in U.S. Pat. No. 5,714,093 (based upon Ser. No. 08/327,438) and Non-Provisional patent application Ser. No. 09/130,790 (Attorney Docket No. EL007RH-3), filed on Aug. 7, 1998 and entitled "Corrosion Resistant Lubricants, Greases and Gels".

In one aspect of the invention, the improved pin is used in a temporary fashion in that the improved pin is inserted into the link, and removed after delivering the grease or gel within with the link. A conventional pin can then be inserted into the link.

In another aspect of the invention, the improved pin is employed as a permanent replacement for conventionally used pins. When employed as a permanent replacement, the improved pin permits routine maintenance, e.g., relubrication, without disassembling the link.

In a further aspect of the invention, the aforementioned grease formulations are employed for improving the corrosion resistance of conventional detachable links. These formulations reduce the corrosion rate of an assembled link thereby permitting disassembly of the link.

DETAILED DESCRIPTION

Figure 1:
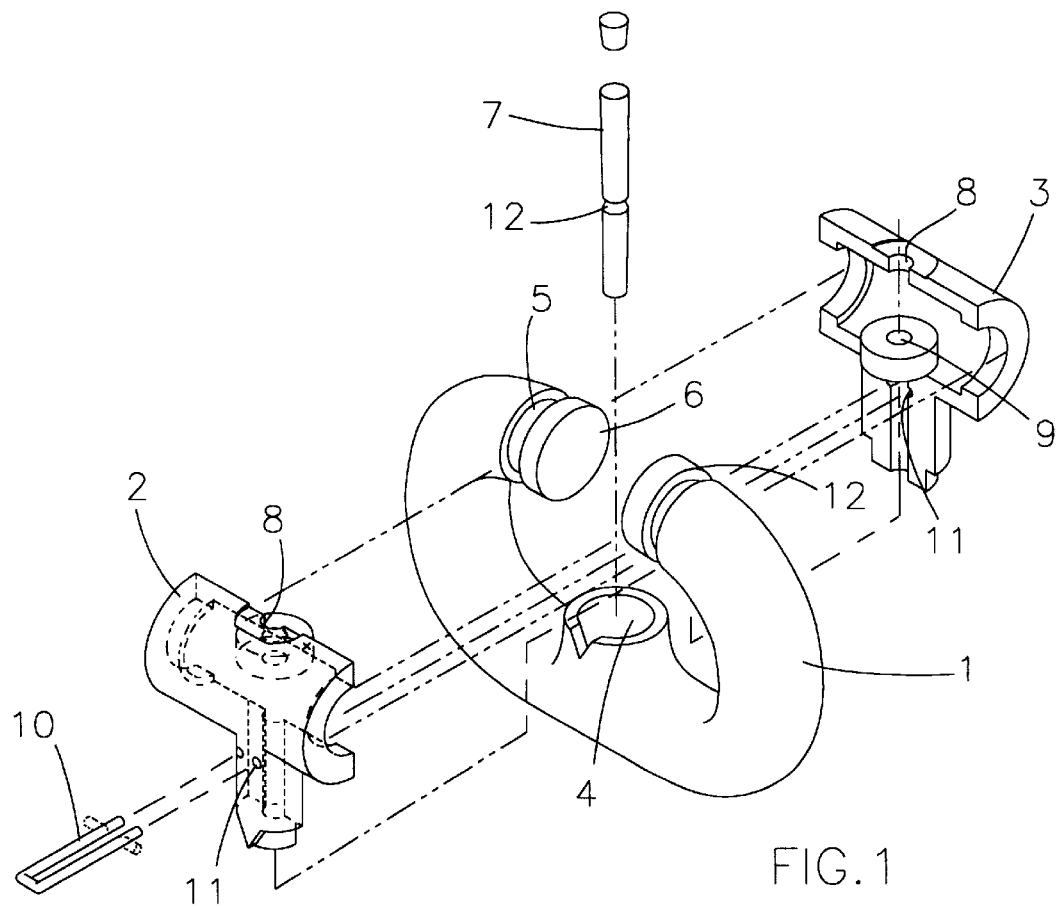
FIG. 1 is an exploded view of a conventional detachable link.

A detachable link comprises a C-link, two coupling plates, and a pin. The instant invention provides an improvement over conventional practices by providing an improved pin for coupling plates that increases the ease at which links are disassembled and maintained. The improved pin structure provides a means for dispensing or delivering grease into the interior cavities of the link. The improved pin can be employed on a temporary basis and employed for dispensing grease into the link, or on a permanent basis for enabling routine maintenance of the link without disassembly.

Broadly, the improved pin comprises a cylindrical article having at least one hollow channel defined along at least an interior portion of the cylindrical portion. A series of holes perpendicular to the hollow channel are drilled in order to allow fluid contact between the channel and interior of the link. An Alimite fitting (also known as a grease "zert") is attached to an end of the pin, and in contact with the hollow channel. The pin can have a tapering cross-section that reduces in diameter at the end of the pin distal from the Alimite fitting. When the pin is inserted into the link, any grease that is introduced into the Alimite fitting will flow through the channel, outwardly through the holes and into the interior of the link. Normally, grease is injected through the Alimite fitting until the grease exits from a seam formed between components of the link.

In one aspect of the invention, the improved pin is employed in an anchor link. Naval applications rely on a myriad of chains to provide normal anchorage, emergency towing and deep water buoy anchorage. In order to accomplish these uses detachable links are used to join sections of chain. The detachable links as shown in the Figures (described below in greater detail) are typically multi-component steel forging held together by a tapered steel pin. The detachable link is susceptible to corrosion; especially when employed in salt water. Typically, the detachable links are included in a routine maintenance schedule which includes opening the links, cleaning, sand blasting and manually applying anti-corrosion compounds.

While the improved pin can be used to deliver any suitable grease or corrosions resistant material, particularly desirable results have been obtained by using a grease based upon a polyalphaolefin, polybutene, among others. Examples of suitable greases can be found in copending and commonly assigned Non-Provisional patent application Ser. No. 09/130,790 filed on Aug. 7, 1998 (Attorney Docket No. EL007RH-3) and entitled "Corrosion Resistant Lubricants, Greases, and Gels"; the disclosure of which is hereby incorporated by reference. While the improved pin can be fabricated from any suitable material, typically the pin will be fabricated the from corrosion resistant metals, e.g., stainless steel, titanium, among others.

In some cases, the aforementioned corrosion resistant greases can form a corrosion resistant mineral layer upon the surface of the link. Mineral and its attendant corrosion resistant properties are described in greater detail in Non-Provisional patent application Ser. No. 09/016,853 (EL001RH-8), filed on even date herewith and entitled "CORROSION RESISTANT COATINGS CONTAINING AN AMORPHOUS PHASE"; the disclosure of which is hereby incorporated by reference.

Figure 1A:
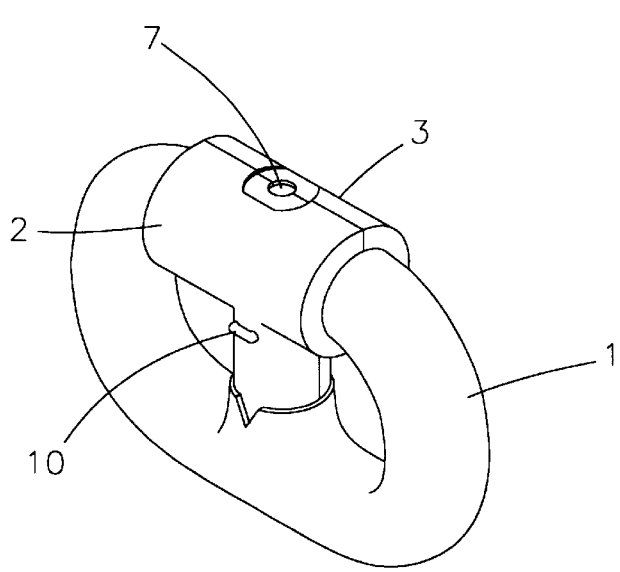
FIG. 1A is an assembled view of the conventional detachable link illustrated in FIG. 1.

Certain aspects of the invention are better understood by reference to the Drawings. Referring now to the Drawings, FIGS. 1 and 1A show a conventional detachable link. Coupling plates 2 and 3 are connected to C-link 1. C-link 1 defines an opening 4 into which hemispherical portions of coupling plates 2 and 3 are inserted. C-link 1 also defines channels 5 upon the terminus portions 6 of the C-link 1. When coupling plates 2 and 3 are inserted into opening 4, mating surfaces of coupling plates 2 and 3 contact channels 5 and portions 6 thereby forming a continuous surface or an assembled link. Normally, C-link 1 and coupling plates 2 and 3 are solid structures. A cavity is defined within the assembled link among the interior surfaces of the C-link and coupling links.

The coupling plates are retained in their assembled position by inserting a pin 7 through an opening 8 defined by coupling plates 2 and 3 once in their assembled positions. The pin 7 also engages opening 9 defined on a protuberance within coupling plates 2 and 3. The pin 7 is retained in its position by an optional hairpin 10. Hairpin 10 is inserted through corresponding slots defined within coupling plates 2 and 3. As the hairpin 10 passes through one coupling plate towards the second link, the hairpin engages channel 12 surrounding the pin 7. The assembled link can be sealed with a lead plug or other suitable means.

In one aspect of the invention, the utility or corrosion resistance of the detachable link illustrated in FIGS. 1 and 1A is improved by applying a corrosion resistant grease within the aforementioned cavity and upon all mating surfaces. The corrosion resistant grease reduces, if not, eliminates crevice corrosion that would prohibit the link from being disassembled. While any suitable grease can be employed, the greases illustrated in the following tables are particularly effective in inhibiting crevice corrosion.

| Component Name | Component Description | Component Manufacturer | Component Wt. Percent |
| --- | --- | --- | --- |
| A | | | |
| Indopol H-50 | Polybutene Oil | Amoco Chemical Co. | 61% |
| OKO-S-70 | Linseed Oil | ADM Corp. | 5% |
| Epon SU-2.5 | Epoxy Resin | Shell Chemical Co. | 15% |
| Cabosil TS-720 | Fumed Silica | Cabot Corp. | 5% |
| Hubersorb 600 | Synthetic Calcium Silicate | J. M. Huber Corp. | 8% |
| Lithium Stearate | Lithium Stearate | Reagens Canada LTD | 6% |
| B | | | |
| Indopol H-50 | Polybutene Oil | Amoco Chemical Co. | 61% |
| OKO-S-70 | Linseed Oil | ADM Corp. | 5% |
| Spenkel F34-M-100 | Linseed Modified Polyurethane | Reichhold Chemical Co. | 15% |
| Cabosil TS-720 | Fumed Silica | Cabot Corp. | 5% |
| Hubersorb 600 | Synthetic Calcium Silicate | J. M. Huber Corp. | 8% |
| Lithium Stearate | Lithium Stearate | Reagens Canada LTD | 6% |
| C | | | |
| Durasyn 174 | Polyalphaolefin Oil | Amoco Chemical Co. | 57.8% |
| Lanolin, USP | Lanolin | Lanatex Products | 16.2% |
| Cabosil TS-720 | Fumed Sillica | Cabot Corp. | 7.0% |
| Lithium Stearate | Lithium Stearate | Reagens Canada LTD | 5.5% |
| S-395-N5 | Micronized Polyethylene | Shamrock Technologies | 2.7% |
| Baghouse Fines | Sodium Silicate | PQ Corp. | 2.7% |
| Epon SU-2.5 | Epoxy Resin | Shell Chemical Co. | 8.1% |
| D | | | |
| Durasyn 174 | Polyalphaolefin Oil | Amoco Chemical Co. | 59% |
| Baghouse Fines | Sodium Silicate | PQ Corp. | 25% |
| Zinc Borate | Zinc Borate | U.S. Borax | 5% |
| Cabosil TS-720 | Fumed Silica | Cabot Corp. | 10% |
| Indigo Dye | Blue Dye | Aldrich Chemical Co. | 1% |

Figure 2:
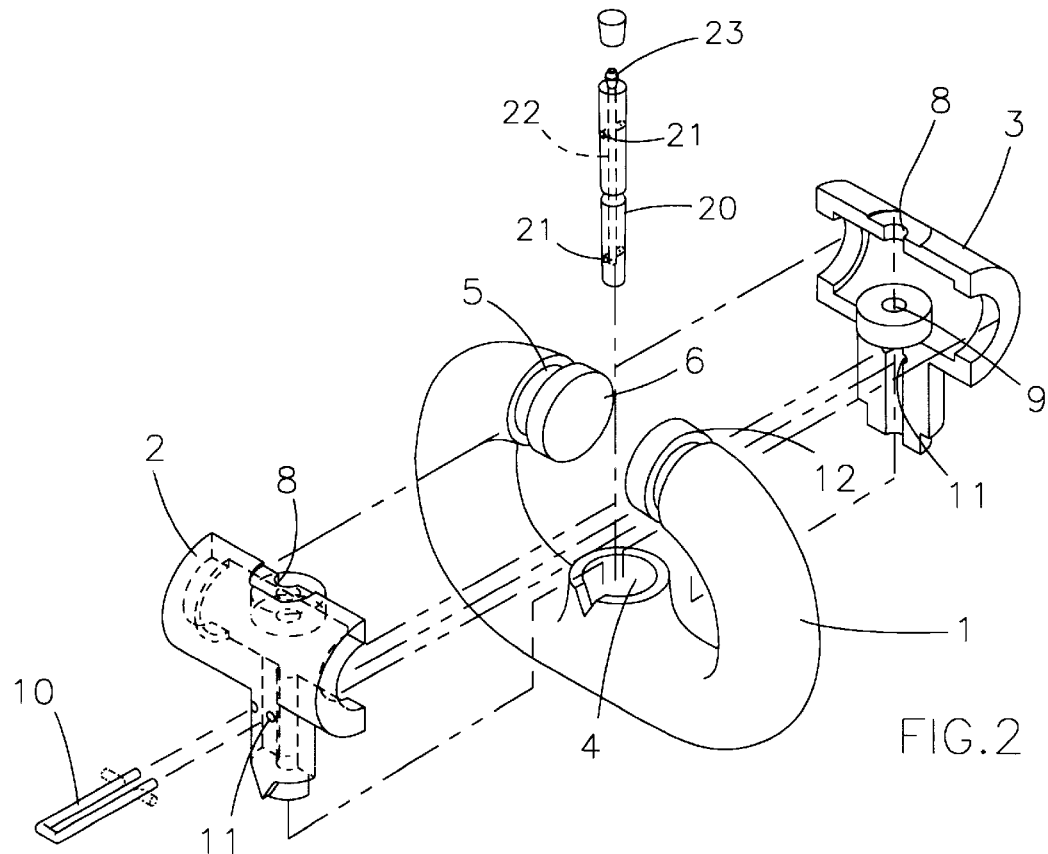
FIG. 2 is an exploded view of one aspect of the invention that illustrates a permanent pin having a tapering cross-section.

Referring now to FIG. 2, FIG. 2 shows an aspect of the invention wherein the improved pin 20 is inserted into a conventional link as a permanent component of the link. Improved pin 20 can be employed as a replacement for pin 7 described above in connection with FIGS. 1 and 1A. Pin 20 defines passageways 21 along the longitudinal axis, and passageways 22 perpendicular to passageways 21. Corrosion resistant grease is introduced into passageways 21 and 22 via allimite fitting (or other suitable fluid control device) which in turn function to distribute the corrosion resistant grease within the assembled link. A conventional means for supplying grease (or other corrosion resistant material) is connected to the allimite fitting. Grease passes through the fitting, along the channel within the pin and into the interior of the link. Normally, grease supply is continued until the grease exits between one or more seams formed among the components of the link. The allimite fitting can be removed, if desired, or protected from the environment by being sealed with a plug. The plug can be removed and the link re-lubed by introducing additional quantities of grease into the assembled plug.

Certain matting surfaces of the link are coated with a room temperature vulcanizing (RTV) compound that can be in the form of a compliant gasket, painted coating, among other application methods. An example of RTV includes Dow Corning Gasket RTV. The link is assembled as illustrated in the Figure. As described above in connection with FIGS. 1 and 1A, after inserting the pin 20 into the link, the assembly is held together by a generally U-shaped retaining clip or wire. The open area defined between the pin and coupling plate is normally sealed with a plug or other suitable sealant means.

Figure 3:
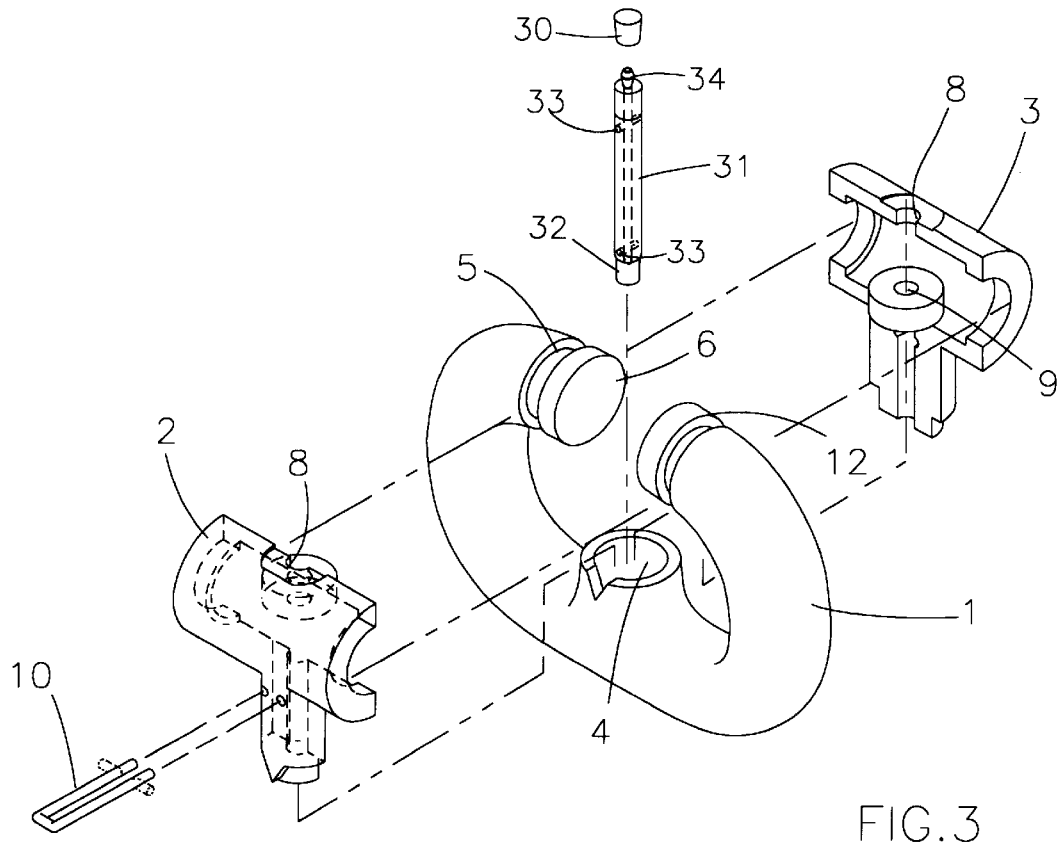
FIG. 3 is an exploded view of an aspect of the invention that illustrates a permanent pin having welded sections and a tapering cross-section.

Referring now to FIG. 3, FIG. 3 shows another aspect of the invention that employs an improved permanent pin 30 having welded sections 32 and a tapering cross-section 32. The welded sections are employed in order to minimize the length of any single drilled section, i.e., drilling along the longitudinal axis of the pin to form the channels 33. The link assembly and method for supplying the grease via fitting 34 are described above in connection with FIG. 2.

Figure 4:
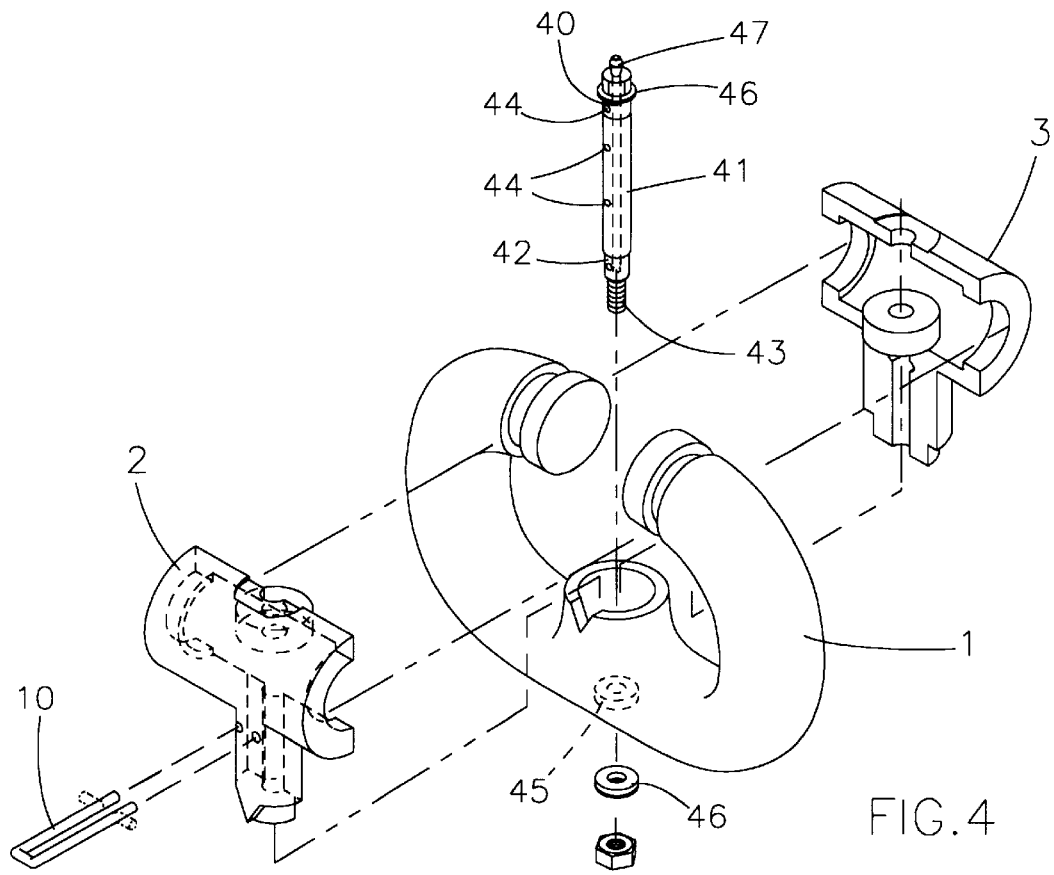
FIG. 4 is an exploded view of an aspect of the invention that illustrates a permanent pin having welded sections and a tapering cross-section, and a threaded end.

Referring now to FIG. 4, FIG. 4 shows is an exploded view of an aspect of the invention that illustrates a permanent pin 40 having welded sections 41, a tapering cross-section 42, a threaded end 43 and passageways 44 (as described above in connection with FIG. 2). The end of the pin 40 having thread extends through the C-link and exits C-link via opening 45. Normally, the opening 45 is counter-bored and can receive a nut/washer or other suitable fastening means for threaded end 43. Normally, a second sealing washer 46 is located between the grease fitting 46 and the C-link. By employing this improved permanent pin the aforementioned retaining clip or wire can be obviated. The link is assembled and grease supplied in the manner described above in FIG. 2.

Figure 4A:
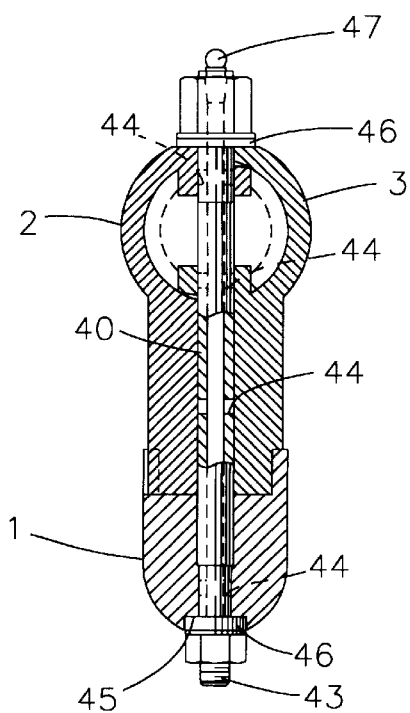
FIG. 4A is a cross-sectional view of the pin illustrated in FIG. 3.

FIG. 4A is another view of improved pin 40 illustrated in FIG. 4. In particular, FIG. 4A illustrates relative location and size of the components of the link.

Figure 5:
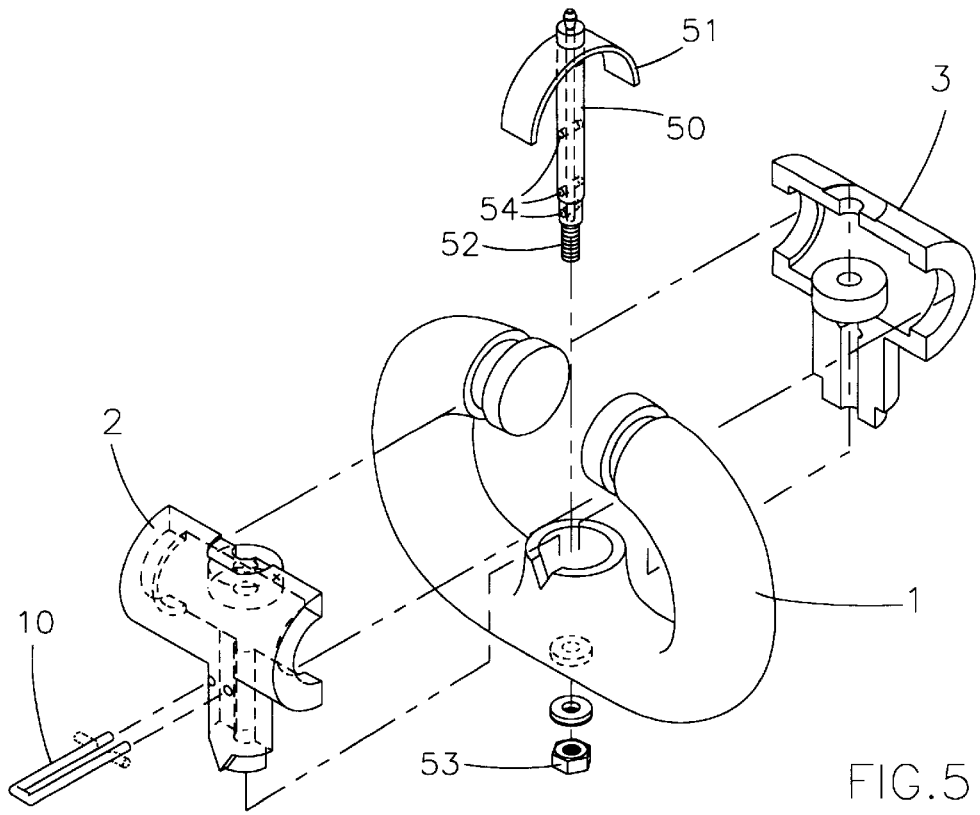
FIG. 5 is an exploded view of an aspect of the invention that illustrates temporary pin that includes a bloster.

Referring now to FIG. 5, FIG. 5 is an exploded view of an aspect of the invention that illustrates temporary pin 50. While any of the aforementioned pins can be employed as temporary pins, this aspect of the invention includes a bolster 51 on one end and a threaded end 52 adaptable for a nut/seal/washer (or other suitable fastening system) 53 on the other. The bolster 51 has a cross-section that inversely replicates the curvature of the assembled link surface in which the bolster contacts when the pin is being used. That is, a compressive force is applied across the link when the bolster 51 contacts the link and the nut 53 is tightened. This compressive force maintains the structural integrity of the link thereby increasing the pressure at which grease can be introduced into the link via passageways 54 within the pin 50. After introducing the grease, the temporary pin is removed and replaced with a conventional pin or one of the previously described improvement pins.

Figure 6:
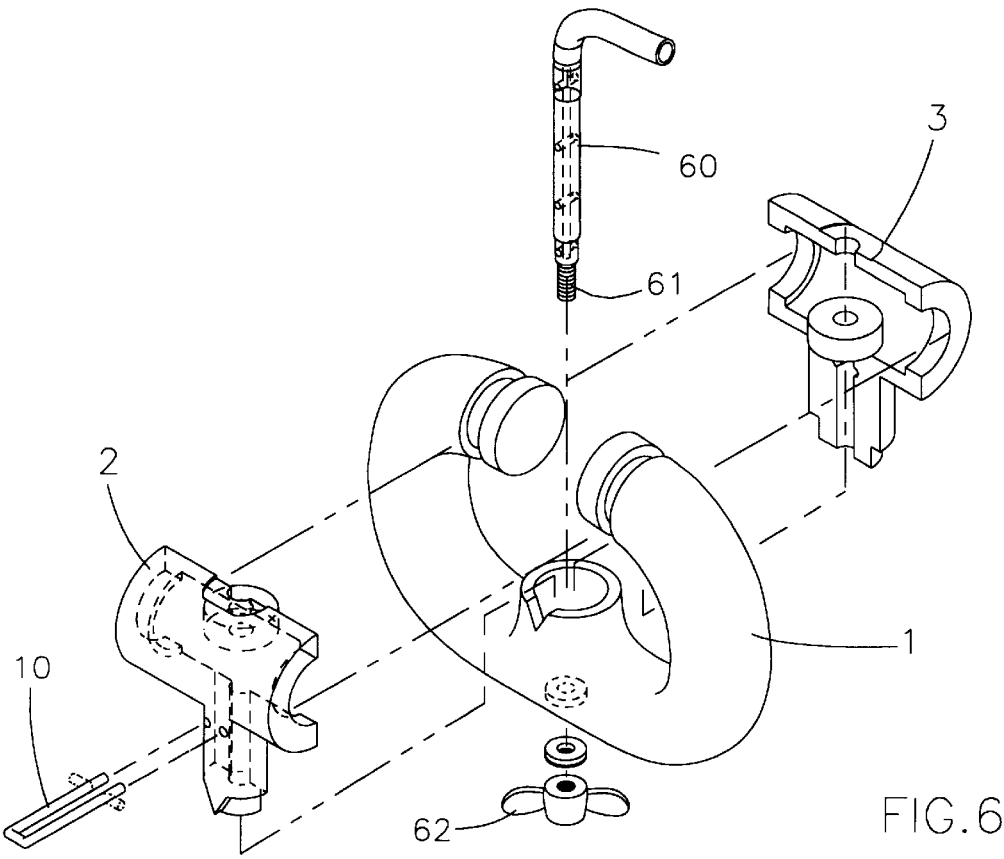
FIG. 6 is an exploded view of one aspect of the invention that illustrates a temporary pin permanently affixed to the delivery systems.

Referring now to FIG. 6, the improved pin 60 could be either a permanent component of the link, or employed as an insertable tool utilized during routine maintenance. The improved pin 60, similar to the above pins defines passageways, and can be attached to a flexible hose that is in turn connected to a delivery pump. The existing pin is removed from the link and the improved pin 60 (shown in FIG. 6) is inserted into the link and dispenses a corrosion resistant material, e.g, grease. Pin 60 can be maintained in a desired position by including a threaded portion 61 that extends through the C-link (as described above in connection with FIGS. 4 and 4A). The threaded portion 61 can engage conventional fastening devices such as a wing nut/seal/washer assembly 62. This configuration would reduce the amount of loose hardware required for replenishing the connecting links as well as eliminating the potential discharge at the hose/zert connection.

By employing the improved pin in its various embodiments, a link can receive routine maintenance/relubrication thereby increasing the useful life of the link. The improved pin also reduces the time and expense associated with link maintenance.

The following Examples are provided to illustrate the corrosion resistance of certain greases and the inventive detachable link. These Examples are provided to illustrate not limit the scope of the invention as defined in the appended claims.

EXAMPLE 1

Cyclic test exposure was performed on four detachable link assemblies illustrated in FIG. 1. All mating surfaces and the cavity of the link had been coated with corrosion resistant greases described in the above Tables (these greases are supplied commercially as EDC™ gels by Elisha Products LLC, Moberly, Mo.). The cyclic test exposure included stages for immersion in 5 weight % sodium chloride solution (15 minutes), ambient dry-off (75 minutes), and condensing humidity exposure (22.5 hours). The humidity cabinet conformed to the requirements of ASTM-D2247 with the exception that the condensing temperature was maintained at 120° F. Each test cycle required 24 hours, however on days when the stages were not completed, the anchor links remained in humidity and the cycle was not counted. Each anchor link had its own immersion tank and all immersion tanks were the same size and filled with the same volume of salt solution. Evaporative losses were compensated for by addition of de-ionized water.

Four of the detachable links used for this test had previously been subjected to service conditions. The links were prepared for cyclic testing by manually cleaning out the excess grease, solvent washing with naphtha, and removal of all paint and corrosion products by blasting with glass bead media. The exterior surfaces of the cleaned links were then powder coated with polyester. A detachable link which had previously been subjected to salt spray testing was cleaned and powder coated separately from the other three links. The epoxy polyamide/silicone alkyd enamel system prescribed for use in service was not utilized so that accelerated external corrosion could be achieved. The respective corrosion resistant gels were applied generously to all the internal surfaces of the detachable links and the links were assembled. Excess gel which was forced out through the joints was wiped off. The link that had been reconditioned following the salt spray exposure was filled with the aforementioned corrosion resistant greases.

The links were inspected visually at 20 cycles, 50 cycles, and 95 cycles. At 50 cycles, the tapered pins were removed from the links and inspected after wiping off the corrosion inhibiting gels. After inspection, the respective gels were reapplied in excess to the pins and the pins were reinserted into their respective links. At 95 cycles, the tapered pins were removed and one coupling plate was removed to inspect the internal surfaces for corrosion and condition of the gel.

Inspection of the links at 50 cycles of exposure included visual observation and removal of the tapered pins that hold the links together. The coupling plated were not opened or removed. At 50 cycles of testing, the link which had been reconditioned following salt spray exposure, 100% of the link's external surface was covered with red corrosion. The other three links had red corrosion on 40–50% of their external surfaces and localized tubercles had formed. Red corrosion was visible in the joints on each link, but no significant build up or bridging occurred in the joints. Slight discoloration had occurred near the ends of the tapered pins, but no red corrosion was present. No difficulty was encountered removing the pins from the links.

External surface corrosion ranged from 70% to 100% of the surface area at 95 cycles of exposure. The links coated with greases A, B, C and D links had red corrosion on the following amounts of external surface area respectively: 100%, 70%, 95% and 80%. Numerous corrosion tubules were present on each link. The polyester powder coat paint experienced cracking between areas of corrosion and no corrosion. The joints developed intermittent bridging of corrosion products. The grease A coated link had the most bridging of corrosion products, followed by the grease B and C link. No difficulty was encountered removing the tapered pins from the detachable link assemblies. Inspection of the tapered pins after cleaning revealed no significant corrosion had developed. The EDC gels had successfully prevented corrosion and seizure of the internal surfaces and components.

The grease B coated link had the least (<0.125 inches) amount of red corrosion penetration into the interior of the link from the coupling plate joints. No red corrosion was present inside this link away from the edges of the joints although dark discoloration was intermittent throughout. Corrosion penetration was approximately 0.25 inches on all three detachable links. The corrosion products inside the grease D link were predominantly red in contrast to that of the grease A link which were predominantly black.

EXAMPLE 2

A detachable link, which had been treated with conventional heavy metal containing grease was removed from in-service conditions. The exterior had intermittent areas of corrosion which were more concentrated around joint surfaces. Corrosion inhibiting grease was visible inside the disassembled link with no significant areas of corrosion. No difficulties were encountered with disassembly of the link. Removal of grease was accomplished by soaking for 20 hours in a Safety-Kleen agitated tank and wire brushing with a dremel tool to remove the remaining traces of grease. The cleaned anchor link was documented prior to application of the corrosion inhibiting gel. Approximately 75 cc of grease D was applied to fill the interior surfaces and cavities and then the link was reassembled. Excess material was removed from the outside surfaces at the joints and the exterior joint surfaces were photographed to document pretest condition. The test exposure was performed according to the ASTM-B117 salt spray standard. The condition of the exterior joint surfaces was documented at 500 hour intervals. The test exposure was ended at 1920 hours and the link was removed to document the condition at the exterior joints. The link was then disassembled and the condition of the interior surfaces was documented before and after cleaning in a Safety Kleen cabinet. No soaking or spraying was required to clean out the corrosion inhibiting gel; brushing with the solvent brush was sufficient.

Through the first 1000 hours of salt spray exposure, the external surfaces of the link became progressively more corroded. No corrosion bridging was present in the joint crevices at 624 hours. However, at 1000 hours, the joint crevices still have very little corrosion in them. Areas where corrosion was present in the joint crevices appeared to migrate in from the external surfaces. By 1500 hours of exposure, corrosion products had began bridging across the joint crevices on the outside of the detachable link. The salt spray exposure was ended at 1920 hours. The exterior surface of the anchor link was heavily corroded and corrosion products bridged most of the joint crevices.

No difficulty was encounter during disassembly of the detachable link after completion of the salt spray exposure. The was readily visible and intact. The gel appeared to have stiffened slightly in some areas but no corrosion was visible inside the anchor link. After cleaning, it was evident that no corrosion was present on the C-link interlock lugs, or in the tapered pin slots. Only traces of corrosion had formed along the inside edge of the coupling plate adjacent to the exterior joint. The tapered pin had not corroded.

While particular emphasis has been placed upon using the improved pin for link maintenance, the pin can be employed in a virtually unlimited array of applications requiring fluid, e.g., grease, dispensing in a confined area.

The following is claimed:

1. A detachable link comprising a C-link, at least two coupling plates and a pin wherein at least a portion of the link is coated with a corrosion resistant grease comprising polyalphaolefin or polybutene.

2. A detachable link comprising a C-link, at least two coupling plates and a pin wherein the pin defines at least one passageway and a grease fitting capable of fluid contact with the passageway.

3. The detachable link of claim 2 wherein one end of the pin is threaded.

4. The detachable link of claim 3 wherein the threaded end extends through the C-link.

5. The detachable link of claim 2 wherein the pin defines at least one groove.

6. A detachable link comprising a C-link, at least two coupling plates and a pin wherein the pin defines at least one passageway and wherein at least a portion of the link is coated with a corrosion resistant grease.

7. The detachable link of claim 6 wherein the corrosion resistant grease comprises at least two members selected from the group consisting of polyalphaolefin, polybutene, and an alkali silicate.

* * * * *